Nov. 10, 1942.   H. W. PILCHER ET AL   2,301,578
FEEDING MECHANISM FOR THRESHERS
Filed March 1, 1940          4 Sheets-Sheet 2

INVENTOR:
HAROLD W. PILCHER
LOUIS A. PARADISE
BY
ATTORNEYS.

Nov. 10, 1942.  H. W. PILCHER ET AL  2,301,578
FEEDING MECHANISM FOR THRESHERS
Filed March 1, 1940  4 Sheets-Sheet 3
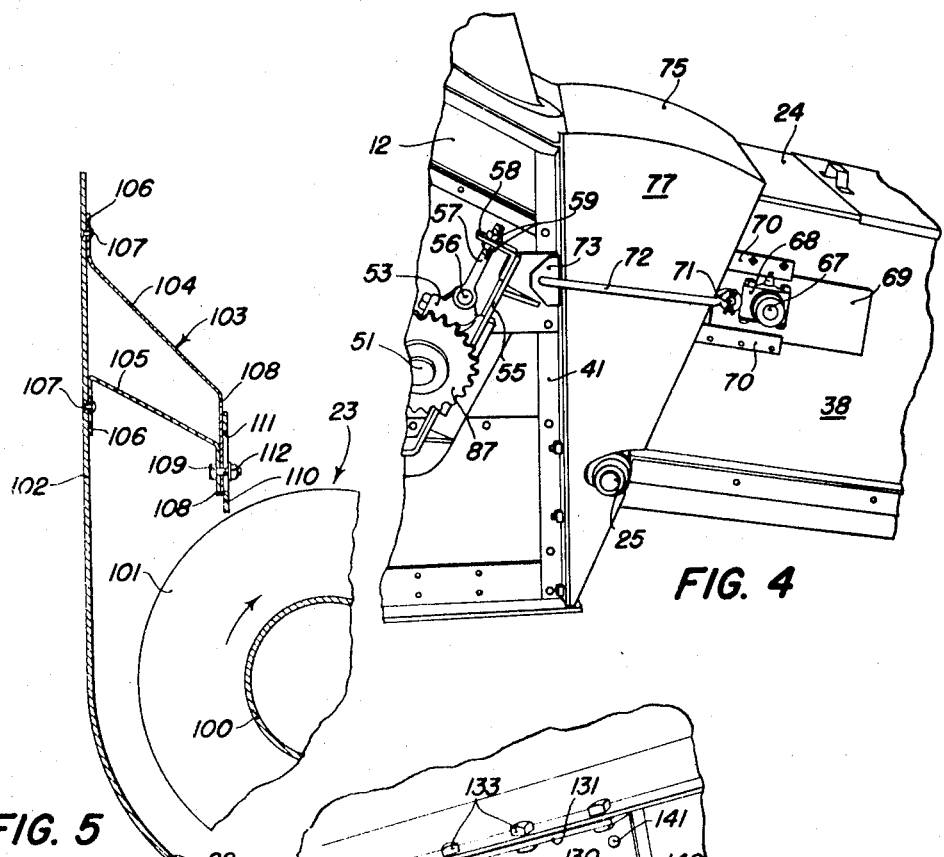
FIG. 4
FIG. 5
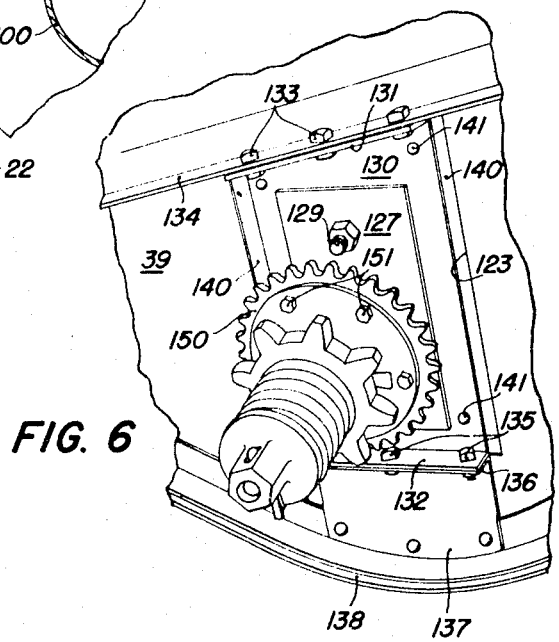
FIG. 6
INVENTOR:
HAROLD W. PILCHER
LOUIS A. PARADISE
BY
ATTORNEYS.

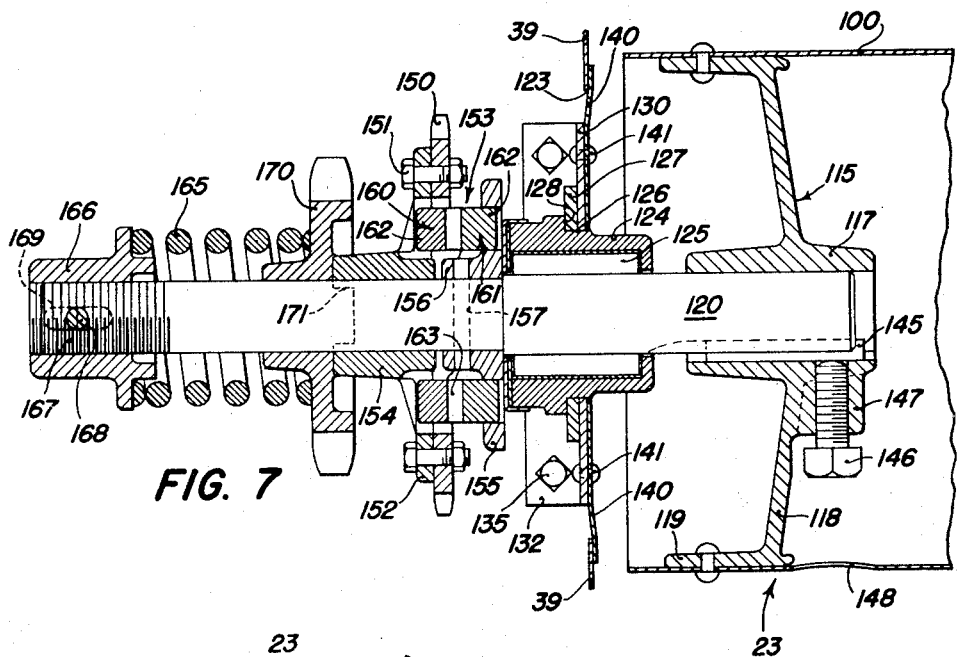
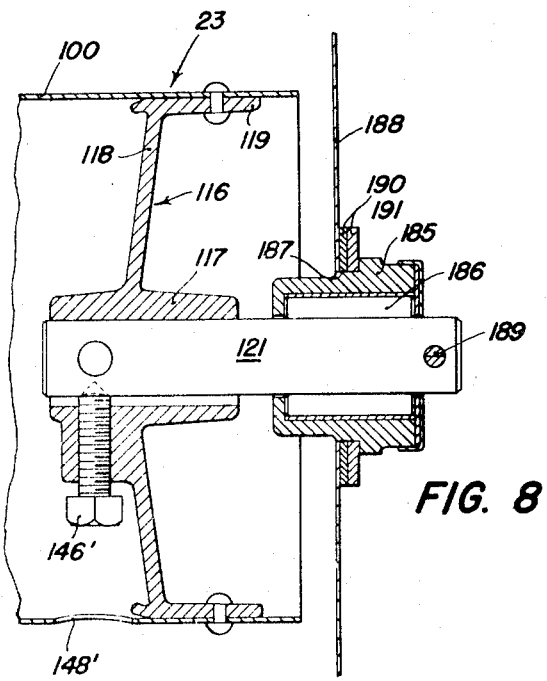

Patented Nov. 10, 1942

2,301,578

UNITED STATES PATENT OFFICE 2,301,578

FEEDING MECHANISM FOR THRESHERS

Harold W. Pilcher, Rock Island, and Louis A. Paradise, Moline, Ill., assignors to Deere & Company, Moline, Ill., a corporation of Illinois Application March 1, 1940, Serial No. 321,678

7 Claims. (Cl. 130—1)

The present invention relates generally to combines and more particularly to the harvesting mechanism for gathering the crops and conveying them to the threshing cylinder. The principal object of this invention relates to the provision of improved harvesting mechanism which operates efficiently under widely varying crop conditions to convey the crop to the threshing cylinder with a minimum loss of grain and with a minimum of clogging or slugging. A further object of this invention has to do with the provision of an improved construction which facilitates the assembly and disassembly of the harvester platform for the purpose of transporting the machine from one field to another through narrow gates.

More specifically, this invention is particularly concerned with a combine of the type having a longitudinally extending thresher body and a laterally extending platform pivotally connected thereto for vertical swinging movement to permit the adjustment of the height of the cutter bar. It is customary in a machine of this type to provide a feeder conveyor between the main platform conveyor and the threshing cylinder and this feeder conveyor is necessarily vertically swingable in order to accommodate the vertical movement of the harvesting platform relative to the thresher body. In the accomplishment of the principal object of this invention we have provided a feeder conveyor of the flexible endless type disposed in front of the threshing cylinder for feeding crops thereto; and to assist in feeding the harvested material into the thresher cylinder, we have provided a rotary beater disposed directly in front of the cylinder and above the rear end of the feeder conveyor. It is desirable, however, to maintain a substantially constant spacing between the rotary beater and the feeder conveyor, as well as a substantially constant spacing between the rotary beater and the threshing cylinder during operation of the machine regardless of vertical movement of the platform which causes a vertical swinging movement of the feeder conveyor. It is, therefore, a specific object of our invention to provide a bearing mounting for the rotary beater which maintains a substantially fixed relation between the feeder, the cylinder, and the conveyor, regardless of vertical movement of the latter.

This invention contemplates the use of a main conveyor of the auger type extending transversely of the machine behind the cutter bar for moving crops along the platform into the feeder house. For transport purposes it is necessary in a machine of this type to reduce the width of the platform to accommodate the machine to narrow roads and gates. To accomplish this purpose we found it preferable to remove the auger in one unitary piece, after which the outer end of the platform can be dismounted. The auger is supported on a shaft which extends across the platform and is supported in a pair of journal bearings at opposite ends thereof carried in the end walls of the platform, respectively, the drive gears and overload release clutch mechanism being mounted on the auger shaft outside of one of the end walls. To facilitate the assembly and disassembly of the auger it is one of the specific objects of our invention to provide a bearing mounting which will permit removing the auger without the necessity of disassembling and removing the drive gear and slip clutch from the auger shaft. In the accomplishment of this object the end wall of the platform is provided with an opening large enough to permit the shaft with the driving mechanism mounted thereon, to be inserted therethrough. The shaft bearing is attached to a plate which can then be rigidly secured to the wall in a position to completely cover the opening.

It is customary to provide a baffle disposed horizontally along the back wall of the platform and extending forwardly over the upper portion of the auger conveyor for the purpose of assisting the conveyor in moving the harvested material along the platform trough and preventing the material from winding around the auger. It is desirable that the forward edge of the baffle extend to a position closely adjacent the upper edge of the auger conveyor in order to act as a stripper in preventing harvested material from being thrown forwardly over the auger under normal conditions. We have found, however, that in certain crop conditions in which there is an abundance of heavy weeds mixed with the grain, it is desirable to increase the clearance between the stripper edge of the baffle and the auger in order to decrease the possibility of the heavy weeds becoming clogged between the auger and the stripper edge. It is, therefore, a still further specific object of our invention to provide means for adjusting the clearance between the stripper edge of the baffle and the edge of the blades of the auger.

These and other objects and advantages of the present invention will be apparent after a consideration of the following description in which reference is had to the drawings apended hereto, in which Figure 1 is a perspective view of a combine embodying the principles of our invention and showing the general arrangement of parts thereof;

Figure 4 is a partial side elevation of the junction between the feeder house and the thresher body, as viewed from the opposite side of the feeder house;

Figure 5 is a fragmentary sectional elevation taken along a line 5—5 in Figure 1 and showing the details of construction of the adjustable baffle over the auger conveyor;

Figure 6 is a perspective view of the mounting for the bearing on the driving end of the auger conveyor shaft and showing the slip clutch and driving gear means on the outer end of the shaft;

Figure 7 is a sectional plan view taken along a horizontal plane passing through the axis of the conveyor shaft and supporting bearing at the driving end of the shaft; and Figure 8 is a sectional plan view similar to Figure 7 but showing the bearing mounting at the opposite end of the auger conveyor shaft.

Figure 1:
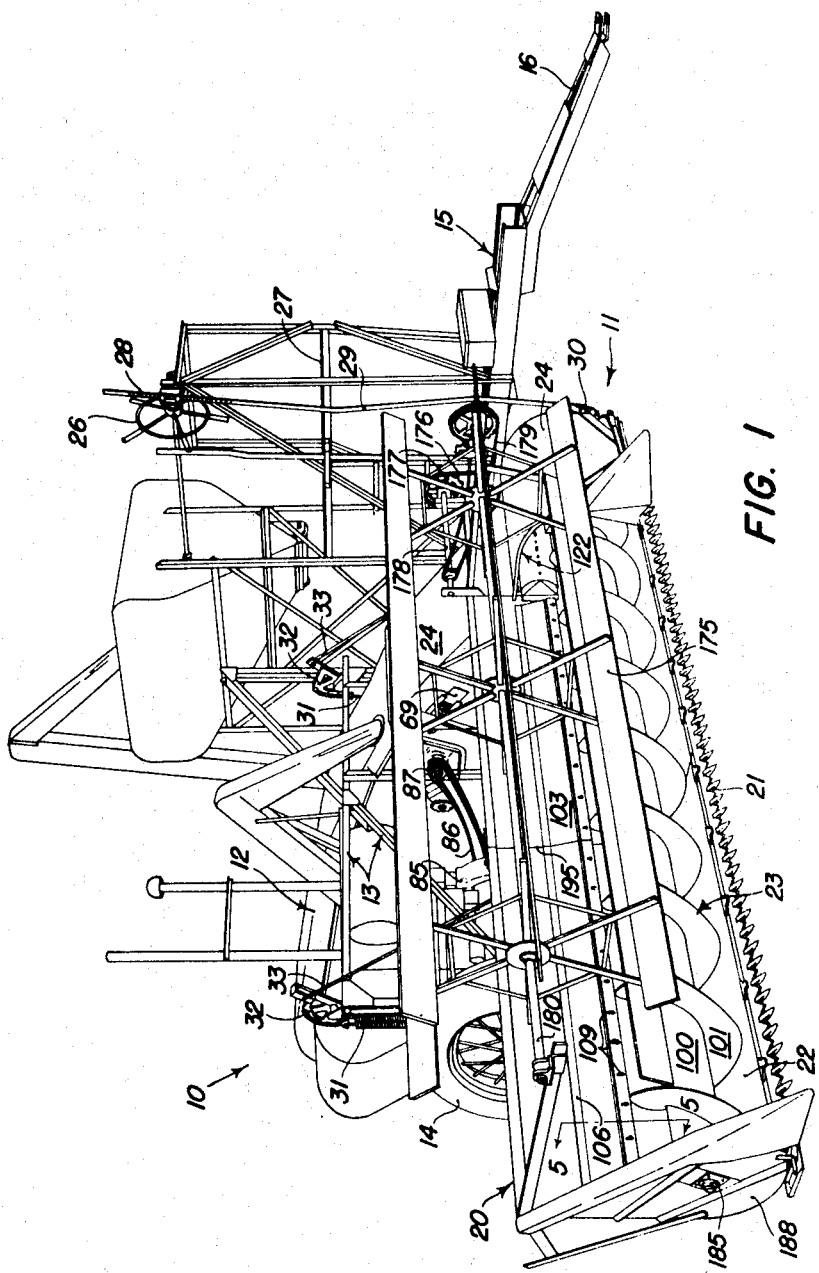

Referring now to the drawings and more particularly to the general arrangement of the combine as shown in Figure 1, the combine indicated generally by reference numeral 10 comprises a harvesting unit indicated in its entirety by reference numeral 11, and a thresher body 12 containing the usual grain threshing and separating mechanism. The thresher body 12 is supported on a structural framework 13 which in turn is carried upon a pair of laterally spaced supporting wheels, one of which 14 is evident in Figure 1. The structural frame 13 has a forwardly extending draft portion 15 rigidly secured thereto and the draft portion 15 is adapted to be supported on the drawbar of a tractor by means of a rigid hitch member 16.

The harvesting unit 11 comprises a transversely extending platform 20 including a conventional cutter bar 21 behind which is disposed a transversely extending conveyor trough 22. A more or less conventional auger conveyor 23 is mounted in the platform trough 22 for rotation about an axis generally transverse with respect to the direction of travel of the combine and is supported by bearing means which will be described more particularly in another part of this description. The auger 23 conveys the harvested material laterally inwardly to a feeder house 24 which extends rearwardly from the inner end of the main conveyor 23 and is rigid with respect to the platform 20.

The feeder house 24 and platform 20 are swingably connected to the thresher housing 12 for vertical swinging movement as a unit about the axis of a transversely disposed shaft 25. Other supporting arms rigidly connected to the platform 20 are pivotally connected to the structural supporting frame 13 for vertical swinging movement about pivots disposed in alignment with the shaft 25, but inasmuch as the general arrangement and construction of the combine is not directly concerned with the present invention, the details of such construction are not deemed to be a necessary part of this description. It is sufficient to say that the platform 20 and feeder housing 24 are vertically swingable as a unitary structure about the axis of the shaft 25 under the control of a hand wheel 26 which is accessible from an operator's platform 27 supported on the draft frame 15. The hand wheel 26 controls a rotatable pinion (not shown) which engages a rack 28 on a vertical lifting rod 29 which extends downwardly to a point of connection 30 at the inner front corner of the feeder housing 24. The harvesting unit is counterbalanced by means of a pair of laterally spaced springs 31 connected to a pair of bell cranks 32 which are in turn connected to the harvesting unit by a pair of tension rods 33.

Figure 2:
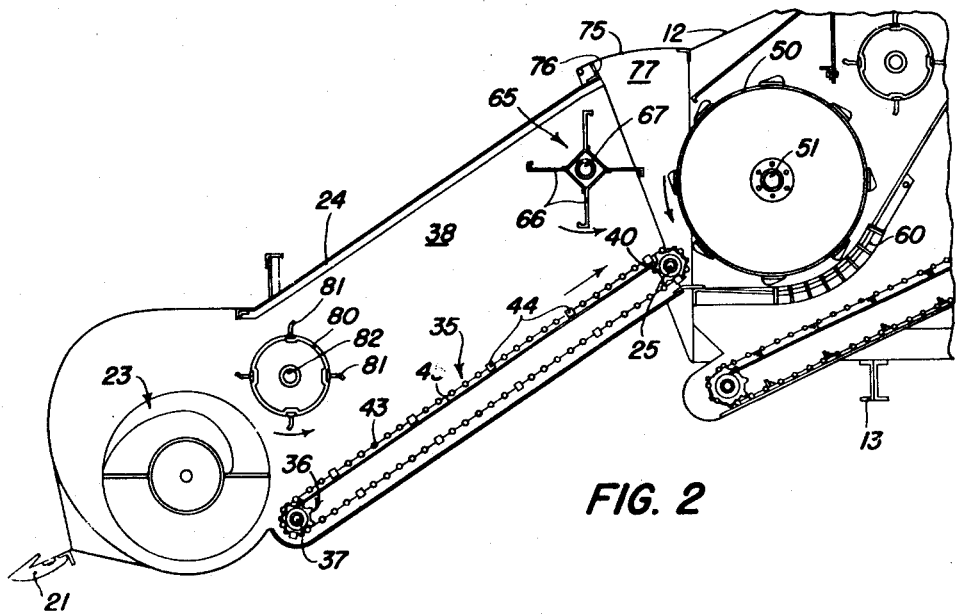
Figure 2 is a side elevational view taken from the stubbleward side of the combine with the wall removed and showing a part of the threshing chamber and the feeder housing and platform.
Figure 3:
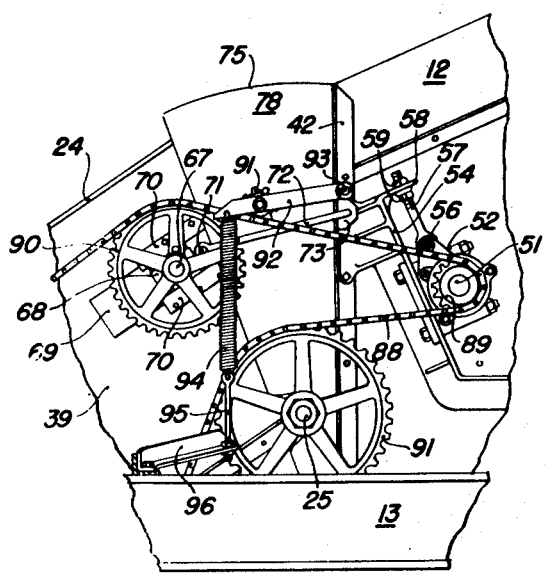
Figure 3 is a fragmentary side elevational view of the combine taken from the stubbleward side of the machine and showing the junction between the feeder house and the thresher body.

Coming now to that part of the implement with which my invention is more particularly concerned and with particular reference to Figures 2, 3 and 4, the inner end of the auger conveyor 23 discharges the harvested material upon a rearwardly extending conveyor of the flexible endless type 35. The conveyor 35 comprises a lower roller 36 mounted on a shaft 37 disposed rearwardly of and adjacent to the auger conveyor 33 and journaled at opposite ends thereof in the side walls 38, 39 of the feeder housing 24. An upper conveyor roller 40 is mounted on the shaft 25 which is journaled in bearings which are mounted on the vertical frame members 41, 42 respectively, at the front end of the thresher body 12. The flexible endless conveyor member 35 consists of a pair of laterally spaced drive chains 43 connected together at intervals by transverse wood slats 44 which pass upwardly along a platform sheet 45 which is supported at its upper and lower ends upon the shafts 25, 37, respectively. It is now evident that as the platform and feeder house swing vertically about the transverse shaft 25, the feeder conveyor 35 also swings about the same axis and therefore the upper end of the conveyor remains in a fixed position relative to the thresher body as the feeder house swings vertically.

The threshing cylinder 50 is rotatably mounted in the front of the thresher body 12 on a transverse shaft 51 which is journaled at opposite ends thereof in a pair of bearings 52, 53, the latter being shiftable along a pair of inclined guideways 54, 55, respectively. Connected to each of the bearings 52, 53 by means of a pivot pin 56, is a swinging link 57 in the form of an eye bolt having a threaded shank which is received in an aperture in a bracket 58 fixed to the upper end of each of the guideways 54, 55. The cylinder is secured in adjusted position along the guideways by means of a pair of lock nuts 59 threaded on the eye bolts 57 on opposite sides of the bracket 58. The purpose of this adjustment is to set the proper clearance between the threshing cylinder 50 and the concaves 60 which are fixedly supported in the thresher housing 12 beneath the cylinder 50.

A second feeder in the form of a rotary beater 65 is positioned above the flexible conveyor 35 at the upper end thereof and immediately in front of the cylinder to assist the conveyor 35 in feeding harvested material into the threshing cylinder. The rotary beater 65 comprises a plurality of radially extending blades 66 supported on a shaft 67 which is journaled at its opposite ends, respectively, in a pair of bearings 68, on the outside of each of the side walls 38, 39 of the feeder housing 24. Each of the bearings 68 is mounted on a vertical plate 69. Each of the plates 69 is shiftable fore and aft in guideways 70 secured to the outsides of the feeder house walls 38, 39, respectively. The guideways 70 are disposed generally parallel to the feeder conveyor 35 so that the rotary beater 65 can be shifted fore and aft parallel to the feeder conveyor. The side walls 38, 39 of the feeder house 24 are, of course, slotted to permit the feeder shaft 67 to move in this manner. Each of the slidable plates 69 is connected by means of a pin 71 to a rearwardly extending link 72, the rear ends of the links being swingably connected to brackets 73 fixed to the vertical frame members 41, 42 at opposite sides of the front of the thresher housing 12, respectively. Thus, it is evident that as the feeder house 24 swings vertically during harvesting operation, the rotary beater is shifted fore and aft in the guideways 70 by the action of the vertically swingable links 72 which tend to maintain a substantially constant spacing between the rotary beater 65 and the threshing cylinder 50, and since the guideways 70 are parallel to the feeder conveyor 35, the rotary beater is maintained at a constant spacing above the feeder conveyor in all positions of the feeder house 24. Thus it is evident that the effectiveness of the rotary beater 65 in feeding grain to the threshing cylinder, is not impaired by the vertical adjustment of the cutter bar and feeder house.

The junction between the feeder house 24 and the thresher body 12 is sealed by means of an arcuate hood 75 which is curved about a radius extending from the axis of the shaft 25. An angle frame member 76 is fixed transversely across the upper edge of the feeder house 24 and slides in contact with the hood 25 as the feeder house swings vertically to maintain the seal between the feeder house and the thresher body 12. A pair of side walls 77, 78 are fixed to the hood 75 and extend downwardly on opposite sides of the feeder house 24 to seal the sides of the opening between the feeder and the thresher body.

At the forward end of the conveyor 35 and spaced above the latter and behind the auger conveyor 23, is a stripper cylinder 80 having a plurality of outwardly extending fingers 81 adapted to engage harvested material which tends to cling to the blades of the auger and toss the latter rearwardly upon the flexible feeder conveyor 35. The stripper cylinder 80 is mounted on a shaft 82 carried in suitable bearings in the opposite side walls 38, 39 of the feeder house 24.

The harvesting and threshing mechanism on the combine are driven by means of an auxiliary gasoline motor, indicated at 85, (see Figure 1). The motor 85 drives the threshing cylinder by means of a chain 86 which engages a sprocket 87 on the grainward end of the threshing cylinder shaft 51 (see Figure 4). The feeder conveyor 35 and beaters 65, 80 are driven by means of a flexible chain 88 (Figure 3) which engages a sprocket 89 fixed to the opposite end of the thresher cylinder shaft 51. The chain 88 is trained over a sprocket 90 fixed on the shaft 67 of the rotary beater 65 and also passes over a sprocket 91 on the shaft 25 for driving the upper roller of the conveyor 35. The chain 88 is also trained over a sprocket, not shown, on the shaft 82 of the stripper cylinder 80, and also chain tightening means for taking up the slack in the chain resulting from the vertical swinging movement of the feeder house 24. The chain tightener comprises an idler 91 journaled on an arm 92 which is pivoted at 93 on the thresher housing 12 above the chain 88 and engages the latter to maintain tightness. The arm 92 is urged downwardly by means of a spring 94 connected to an eye bolt 95 which is adjustably fixed to a frame member 96 rigidly mounted on the combine frame 13.

The auger conveyor 23 comprises a hollow shaft 100 of a substantial diameter to prevent wrapping of the stalks thereabout and supported on the hollow shaft 100 is a helically wound auger blade 101 which is wound in such a direction that the harvested material is moved toward the feeder house when the auger is turned in a clockwise direction, as viewed from the grainward side, as in Figure 5. The auger is disposed in a platform trough 22 which is preferably curved about the axis of rotation of the auger 23. The trough is continued upwardly at the rear of the auger to form a back wall 102 which extends along the entire length of the platform. As is customary in a platform having an auger conveyor, a horizontal baffle, indicated in its entirety by reference numeral 103, is mounted on the back wall 102 and extends along the length thereof and projects forwardly over the upper side of the auger 23. The baffle 103 comprises a pair of upper and lower sheet metal strips 104, 105, respectively, having rear flanges 106 serving to support the strips on the back wall by means of rivets 107. The strips 104, 105 converge downwardly and forwardly from the back wall and have a pair of downwardly turned outer flanges 108 which fit closely together and are joined by means of a series of bolts 109. The lower edges of the flanges 108 terminate above the upper portion of the auger 23 and are vertically spaced from the edges of the helical veins 101 of the auger.

Although it is customary to provide such a baffle for the purpose of engaging any stalks that tend to pass over the top of the auger by virtue of the rotation of the latter and thus cause the stalks to be moved laterally along the back wall 102 toward the feeder house, we have discovered that the efficiency of the baffle can be greatly increased by providing a means for adjusting the clearance between the stripper edge along the forward edge of the baffle and the auger conveyor 23. Heretofore, it has been customary to provide non-adjustable baffles with sufficient clearance over the auger to prevent heavy weed stalks from clogging the gap between the baffle and the auger blades, but when operating in other conditions where the crops are clean and with few weeds, the auger does not operate at its maximum efficiency due to the clearance being more than necessary. Accordingly, we have provided an adjustable stripper edge in the form of an adjustable edge plate 110, which lies in juxtaposition with the downwardly turned flanges 108 of the baffle strips 104, 105, and extending along the entire length of the baffle 103. The plate 110 is provided with vertically extending slots 111 through which the bolts 109 are inserted. The slots 111 permit vertical adjustment of the plate 110 relative to the bolts 109 to increase or decrease the clearance between the lower edge of the stripper plate 110 and the vanes 101 of the auger 23. The plate 110 is rigidly fixed to the baffle strips 104, 105 by tightening the nuts 112 on the bolts 109.

Each end of the hollow shaft 100 of the auger 23 is supported on a spider 115, 116, respectively, (see Figures 7 and 8). Each of the spiders comprises a casting having a hub portion 117 carrying a radial web portion 118, which carries at its outer edge an axially extending flange 119 for supporting the hollow shaft 100. The hubs 117 are each supported on a stub shaft 120, 121, respectively. The stubbleward end of the conveyor 23 extends into the feeder house 24 which has an opening 122 in its grainward side to receive the auger, as best shown in Figure 1. The stubbleward wall 39 of the lower portion of the feeder house 24 is provided with an aperture 123 through which the stub shaft 120 extends beyond the wall 39. The shaft 120 is journaled in a bearing hub 124 provided with suitable anti-friction rollers 125 and the hub 124 has a cylindrical portion 126 that is accurately machined to fit snugly within a cooperative aperture in a plate 127, which sets against a shoulder 128 on the hub. The plate 127 is rigidly fixed by means of bolts 129 to a supporting plate 130 having outwardly turned upper and lower flanges 131, 132, respectively. The upper flange 131 is rigidly but detachably fixed by means of bolts 133 to the outwardly extending flange of a structural frame member 134 extending generally fore and aft along the side of the wall 39 of the feeder housing. Similarly, the lower flange 132 is rigidly but detachably connected by bolts 135 to the outwardly turned flange 136 of a bracket 137 which is secured to the lower frame member 138 of the feeder house. Thus the supporting plate 130 is supported by means of the bolts 133 directly within the opening 123 in the wall 39 of the feeder house. The opening 123 is tightly sealed by means of a sealing plate 140 which is apertured to receive the hub 124 and is fixed to the supporting plate 130 by rivets 141 and thus bears firmly against the inside of the feeder house wall 39 to prevent loss of harvested material through the opening 123.

The stub shaft 120 is secured within the hub 117 by means of a key 145 disposed in suitable aligned grooves in the hub 117 and stub shaft 120, and held in place by means of a set screw 146 which is threaded into a boss 147 in the hub. The set screw 146 can be tightened or loosened by inserting a suitable socket wrench through an opening 148 in the hollow shaft 100 in alignment with the set screw 146. Thus it is evident that the stub shaft 120 is disposed in driving relation to the hub 117.

The stub shaft 120 is driven by means outside the feeder housing wall 39, as will now be described.

The stub shaft 120 is driven by a chain (not shown) extending from a drive sprocket on the shaft 82 of the stripper cylinder 80 and inasmuch as this drive sprocket is of conventional construction it is not shown in detail in the drawings. The drive chain is trained over a sprocket 150 which is secured by means of bolts 151 to one member 152 of a slip clutch or overload release clutch, indicated in its entirety by reference numeral 153. The clutch member 152 has a hub 154 which is rotatably journaled on the shaft 120 and is also slidable axially on the latter. The other member 155 of the slip clutch 153 has a hub 156 which is rigidly fixed to the stub shaft 120 by means of a pin 157 extending through aligned apertures in the shaft 120 and member 155. The two clutch members 152, 155 are provided with a pair of intermeshing annular jaw collars 160, 161, respectively, each of said jaw collars being provided with axially extending lugs 162 which fit into corresponding recesses in the respective clutch member 152, 155, and thereby holding the jaw collars in driving relation with the respective clutch members. The jaw collars 160, 161 are provided with intermeshing, hard clutch jaws 163 which are of such a shape as to cause a component of the driving force to tend to separate the two clutch members by urging the driven member 152 outwardly axially along the shaft 120, in well-known manner. This axial movement of the clutch member 152 is resisted by means of a strong compression coil spring 165 which encircles the outer end of the stub shaft 120 and bears against an adjusting nut 166 which is threaded on the outer end of the stub shaft 120, the latter being correspondingly threaded, as indicated at 167. The adjusting nut 166 is secured in adjusted position by means of a pin 168 which is adapted to be inserted through an elongated opening in the adjusting nut 166 which can be aligned with a suitable aperture 169 in the shaft 120 to receive the pin 168. The spring 165 bears against a sprocket 170 which is slidably disposed on the shaft 120 and has driving jaws 171 which interengage with corresponding jaws on the hub 154 of the clutch member 152. Thus the force of the spring 165 is transmitted through the sprocket 170 against the movable clutch member 152.

The purpose of the sprocket 170 is for driving the harvester reel 175 (see Figure 1), by means of a chain 176 which drives a sprocket 177 fixed to a countershaft 178 journaled above the feeder house 24 and which in turn is connected by another chain 179 to the shaft 180 of the reel 175.

The stub shaft 121 at the opposite end of the auger 23, is fixed in the spider hub 117 by means of a set screw 146' which is adjustable through an opening 148' in the hollow shaft 100. The outer end of the stub shaft 121 is supported in a bearing hub 185, containing suitable anti-friction rollers 186. The hub 185 fits into an opening 187 in the end wall 188 at the grainward end of the platform and suitably secured therein by means of a cotter pin 189 inserted through an opening in the end of the stub shaft 121 outside of the bearing hub 185. One or more spacing washers 190 are inserted between the end wall 188 and a shoulder 191 on the bearing hub to prevent too much end-play of the latter on the stub shaft.

To prepare the combine for transport, the width of the machine must be reduced in order to permit it to pass through narrow gates and along narrow roads. The reel and sickle are first removed from the platform and the details of these operations form no part of the present invention. The cotter pin 189 is then withdrawn from the end of the stub shaft 121 and the bearing hub 185 and washers 190 are removed from the end wall 188. The platform 20 is then separated at its line of division, indicated at 195 in Figure 1, by removing certain bolts, the details of which form no part of the present invention. The outer half of the platform is then removed, after which the auger bearing supporting plate 130 is disconnected from the feeder house wall 39 by removing the bolts 133, 135. The entire auger 23 can then be slid out of the feeder house without dismantling the stubbleward bearing 124 or without removing the sprockets or the slip clutch from the stub shaft 120. The supporting plate 130 and the entire driving mechanism including sprockets and slip clutch merely pass through the opening 123 which is large enough to accommodate the removal of these parts therethrough. This is a great convenience over the conventional method of disassembly which necessitates dismantling the driving mechanism and thus not only saves time but eliminates the danger of losing some of the many small parts which are assembled in the driving mechanism.

Obviously, the assembly of the combine is merely the converse of the above-mentioned procedure. The stubbleward end of the auger is secured in place once more merely by replacing the six bolts 133, 135.

We claim:

1. In a combine having a body, a threshing cylinder mounted in said body, a feeder unit mounted in front of said cylinder by means providing for vertical swinging movement relative to said body, a rotary beater mounted above said feeder by means providing for vertical movement with said feeder and for shifting movement of said beater along said feeder, and link means connecting said beater with said body to shift the beater as the feeder swings vertically.

2. In a combine having a body and a threshing cylinder rotatably journaled therein, a feeder housing pivotally supported in front of said cylinder for swinging movement about an axis generally parallel to the axis of rotation of the cylinder, a rotary beater disposed in said feeder housing and generally parallel to said cylinder, bearings for supporting said beater, said bearings being shiftably carried by said feeder housing for shifting movement relative to the pivot axis of the latter, and means connecting said bearings to said body to shift said beater as the feeder housing swings vertically.

3. In a machine of the class described having a body and a rotary crop treating cylinder journaled therein, a feeder unit pivotally supported in front of said cylinder for vertical swinging movement relative to said body and including a flexible endless conveyor for moving crops toward said cylinder, a rotary beater disposed above said conveyor, bearing means for rotatably supporting said beater, said bearing means being carried on said feeder unit and shiftable relative thereto along said endless conveyor, and means connecting said bearing means with said body to hold said beater at a substantially constant distance from said cylinder regardless of the vertical swinging movement of said feeder unit.

4. In a machine of the class described having a body and a rotary crop treating cylinder journaled therein, a feeder housing pivotally supported on said body for vertical swinging movement about an axis generally parallel to the axis of rotation of said cylinder and including a flexible endless conveyor in the lower portion of the housing for moving crops toward said cylinder, a rotary beater disposed in said housing above said conveyor, bearing means for rotatably supporting said beater, said bearing means being slidably supported in guideways in said housing providing for shifting said beater generally parallel to said conveyor, and link means connecting said bearing means to said body, whereby the beater is shifted in said guideways as the feeder housing swings about said pivot connection, to maintain the position of the beater substantially constant relative to the conveyor and the cylinder.

5. In a machine of the class described having a body, a feeder unit mounted on said body for vertical movement relative to said body, a feeder mounted on said feeder unit by means providing for shifting movement of said feeder relative to said feeder unit, and means responsive to relative movement between said feeder unit and said body for shifting said feeder with respect to said feeder unit to maintain said feeder at a constant distance from said body as said feeder unit moves with respect to said body.

6. In a combine having a thresher housing and a threshing cylinder mounted therein, a feeder unit mounted on said housing for vertical swinging movement relative thereto, a feeder mounted on said feeder unit by means providing for shifting movement of said feeder relative to said feeder unit, and mechanical means responsive to relative vertical movement of said feeder unit and said housing for shifting said feeder with respect to said feeder unit to maintain said feeder at a constant distance from said threshing cylinder as said feeder unit moves with respect to said threshing housing.

7. In a combine having a thresher housing and a threshing cylinder mounted therein, a feeder unit mounted on said housing for vertical swinging movement relative thereto, a conveyor on said feeder unit, a feeder mounted in said feeder unit by means providing for shifting said feeder relative to said feeder unit along a path maintaining a definite relation to said conveyor, and means connecting said feeder with said housing for shifting said feeder with respect to said feeder unit to maintain said feeder at a constant distance from said threshing cylinder as said feeder unit moves with respect to said threshing housing.

HAROLD W. PILCHER.
LOUIS A. PARADISE.